United States Patent

Becky

[15] 3,679,828

[45] July 25, 1972

[54] ELECTRONIC SCANNER

[72] Inventor: Raymond Becky, McKeesport, Pa.

[73] Assignee: Westinghouse Air Brake Company, Swissvale, Pa.

[22] Filed: Oct. 8, 1969

[21] Appl. No.: 864,752

[52] U.S. Cl. ..................178/7.6, 340/143.6 RR, 178/DIG. 1
[51] Int. Cl. ..........................................................H04n 7/00
[58] Field of Search.............................178/7.6, 7.85, DIG. 1; 340/143.6 RR

[56] References Cited

UNITED STATES PATENTS

| | | | |
|---|---|---|---|
| 3,145,291 | 9/1964 | Brainerd | 340/146.3 RR |
| 2,899,132 | 9/1959 | Orthuber | 340/146.3 RR |
| 3,225,177 | 12/1965 | Stites et al. | 340/146.3 RR |

*Primary Examiner*—Robert L. Griffin
*Assistant Examiner*—Barry Leibowitz
*Attorney*—H. A. Williamson, A. G. Williamson, Jr. and J. B. Sotak

[57] ABSTRACT

This disclosure relates to a static type of opto-electronic scanner for sensing the coded markings of an information field. The scanner includes a source of radiant energy for illuminating the information field, an optical system for directing radiant energy onto the information field and for resolving received radiant energy from the information field into separate images and an electronic pickup means for sampling and scanning the separate images to produce video signals in accordance with the coded markings of the information field.

14 Claims, 6 Drawing Figures

INVENTOR
Raymond Becky
BY John B. Sotak

INVENTOR
Raymond Becky.
BY John B Sotak

ELECTRONIC SCANNER

My invention relates to optic-to-electronic scanning apparatus and, more particularly, to improved static opto-electronic scanners having a unique coaxial optical system for directing substantially all of the collected radiant energy of a light source onto a coded information field, for resolving reflected radiant energy received from the coded information field and for imaging the resolved radiant energy onto an electronic dissecting means which scans and samples the resolved images of the coded information field.

Various mark sensing or indicia recognition systems are presently employed for automatically reading the coded information or data from objects as they pass a given point along their path of travel. In one application, such as, in an automatic car identification (ACI), the coded data signifying the identity and other relevant information of the particular vehicle is carried by coded labels which are affixed to the sides of the railway vehicles. The vehicle-carried labels are composed of a vertical array of horizontally disposed colored stripes which have the unique retro-reflective characteristic of reflecting substantially all of the incident light back along the path of incidence. A wayside scanner is generally positioned at a given point along the railway track, such as, for example, at the entrance of a classification yard for reading the vehicle-carried information which is subsequently used for classification purposes. The present types of railway wayside scanners generally employ a dynamic type of opto-mechanical arrangement for vertically scanning the color coded label when it enters the field of view of the scanner. That is, the wayside scanner includes a source of radiant energy, an optical system and a motor driven rotation mirrored wheel for repetitively scanning the label. The rotation of the mirrored wheel causes a narrow horizontal beam of light to successively scan the individual stripes of the label and the reflected light from the label is then split by a dichroic optical system into the two separate paths, namely, a red and blue channel for application to individual photoelectric sensors which produce output signals in accordance with the color stripes on the coded label. These output signals are in turn subsequently applied to decoding circuits for converting to intelligent form the identity and the other information carried by the coded label.

While these previous types of opto-mechanical scanners are acceptable and have operated successfully in the past, there are several inherent disadvantages which affect the overall accuracy and reliability of the system. For example, it has been found that in order to take advantage of the rectro-reflective proprieties of the label and, in turn, to reduce the spectral reflections, the wayside scanner is usually slightly angularly displaced, namely, the optical axis is set 7° to 10° off-normal to the plane of the labels. While this slight angular displacement of the scanner has reduced spectral reflections, it has resulted in numerous reading errors to occur. Since the stripes are individually and successively sampled by a rectangular aperture or window which has a vertical dimension slightly less than the width of the strip, the displacement of the scanner causes the viewed stripes, which are located above and below the horizontal plane of the scanning axis, to appear inclined and offset with respect to the viewing aperture. Thus, under certain conditions, the rectangular aperture will be viewing and sampling two differently colored stripes rather than viewing and sampling a single colored stripe. Accordingly, under such a condition, the resolution capability of the scanner is impaired and in many cases the color characteristics are not discernable so that a reading error is introduced. Such an adverse effect is more pronounced and a greater number of reading errors will occur when the vehicle-carried label is not mounted substantially orthogonal to the line of travel. It will be appreciated that uneven loading, tilting, and swaying of the vehicles also deleteriously affects the resolution ability of these previous scanners. Thus, the inability of previous wayside scanners to resolve the color coded information has been a major cause of trouble in the past. A further drawback of the previous dynamic types of wayside scanners lies in the use of the motor driven rotating mirrored wheel which is employed for scanning purposes. The rotating mirrored wheel is generally a massive structure which not only acts as a constant hazard to attending personnel but also imposes other problems which affect the overall operation of the system. Therefore, it will be appreciated that extreme care must be exercised by both attending manufacturing and maintenance personnel during the initial assembly at the factory as well as during the subsequent alignment in the field in order to avoid being injured by the immense rotating mirrored wheel. The rotational movement of the massive mirrored wheel also adversely affects the system in that vibrations are generated within the scanner so that optical alignment and adjustment are frequently required. The electric motor which drives the rotating mirrored wheel is sometimes a cause of problems since mechanical vibrations as well as electrical noises can be introduced into the system at this point.

While various types of static scanners have been proposed in other systems, such as, in document reading, these previous scanners are not compatible with colored coded labels and particularly identification labels carried by railway vehicles. It will be appreciated that in a railroad environment the distance between an identification label and the wayside scanners may vary over a wide range while in a document scanning system the distance between, for example, a check or a piece of mail and the scanning device is fixed. In actual practice, the distance between a scanner and the side of a railway vehicle may vary approximately between 7 to 10 feet due to varying vehicle widths, and, therefore, a static type of railway wayside scanner must have a large depth of field capability. In addition, the adverse environmental conditions to which a railway wayside scanner is exposed, such as, inclement weather, dust and dirt, and extreme vibrations, cause difficulty in providing a reliable, efficient and durable static scanning arrangement. In a color coded vehicle identification system, such as, a system employing labels having a two-position base-four code, namely, a two striped combination pair employing either red, blue, white or black stripes to represent the coded information, the problem of resolution is one which is not normally present in a document reading system which employs monochromatic coded data. Thus, it will be appreciated that in order to obtain useable intelligence in a color coded mark sensing system, it is necessary to explicitly resolve the color characteristics of the coded label in order to provide accurate information for the subsequent decoding circuitry. Further, as mentioned above, in order to optically read the coded information correctly and accurately from a moving railway vehicle, the wayside scanner must be capable of withstanding extreme temperature changes, dry and wet conditions, dirt, dust and other foreign particles and must be adapted to endure the adverse effects of extreme vibrations and shock caused by passing trains themselves. While a static electronic railroad wayside scanner not only must operate under such adverse environmental conditions and also handle the problems of resolution, depth of field, light losses as well as other optical deterrents, the scanner must also conform with other AAR standards, particularly with respect to the degree of accuracy set forth in the AAR requirements.

It is therefore an object of my invention to provide a static type of opto-electronic scanner which overcomes the disadvantages of previous optical scanning apparatus.

Another object of my invention is to provide an optic-to-electronic scanner for scanning the identification label carried by railway vehicles.

A further object of my invention is to provide a new and improved scanning apparatus which is capable of accurately sampling and scanning images of a color coded information label.

Yet another object of my invention is to provide a static opto-electronic scanner for sensing the coded markings of an information field.

Yet another object of my invention is to provide a static optic-to-electronic scanning apparatus which directs substantially all of the collected radiant energy of a light source onto a coded information field which resolves the reflected radiant energy received from the coded information field and which images the resolved reflected radiant energy onto an electronic dissecting means.

Yet another object of my invention is to provide a new and improved scanner which projects a narrow beam of radiant energy onto a coded label in the form of a plurality or a vertical array of horizontally displaced stripes and which produces a pair of undistorted images on the face of an electronic image storage device.

Still yet a further object of my invention is to provide a new and improved static optic-to-electronic scanner which efficiently and accurately reproduces a pair of images of a color coded information label.

Still yet another object of my invention is to provide a new and improved static scanner which is efficient in operation, durable in use, economical in cost, simple in construction, and reliable in service.

In the attainment of the foregoing objects of my invention, the opto-electronic wayside scanner is positioned at a predetermined point along the track and is angularly offset with respect to the line of travel. Thus, the wayside scanner samples and scans the color coded markings of information labels carried by passing railway vehicles. Briefly, the wayside scanner includes a source of light, a coaxial optical system and an electronic image detecting or storage device. The optical system includes a reflector and condenser lens for collecting the radiant energy rays emitted by the light source and a projecting lens for projecting the collected light onto the reflective surfaces of a pair of mirrors. The mirrors are angularly spaced and direct the light onto the coded labels which are constructed from color stripes of retro-reflective material. A reflected image of the colored label is redirected by the retro-reflective material along the line of incidence and passes through a space or aperture provided between the two angularly disposed mirrors onto a dichroic mirror which separates the image into a first and second spectral path. The first spectral path includes a first filter having a first spectral characteristic for only passing light of a first spectral characteristic. The second spectral path includes a second filter having a second spectral characteristic for only passing light having a second spectral characteristic. The two spectral images are imaged upon the face of an electronic scanning device by means of a wide angle objective lens angularly disposed in the two spectral paths. The wide angular objective lens is arranged to remove the angular distortion which is introduced by angularly offsetting the wayside scanner with respect to the surface of the coded labels. The resolved images are electronically sampled and scanned by an electronic scanning device which produces corresponding video signals. After amplification and detection, the signals are transmitted to a suitable location for decoding the vehicle information into intelligent form.

Further objects and advantages of my invention will become apparent as the following description proceeds and the features of novelty which characterize the invention will be particularly pointed out in the claims annexed to and forming a part of this description.

For a better understanding of the invention, reference may be made to the accompanying drawings in which.

Figure 1:
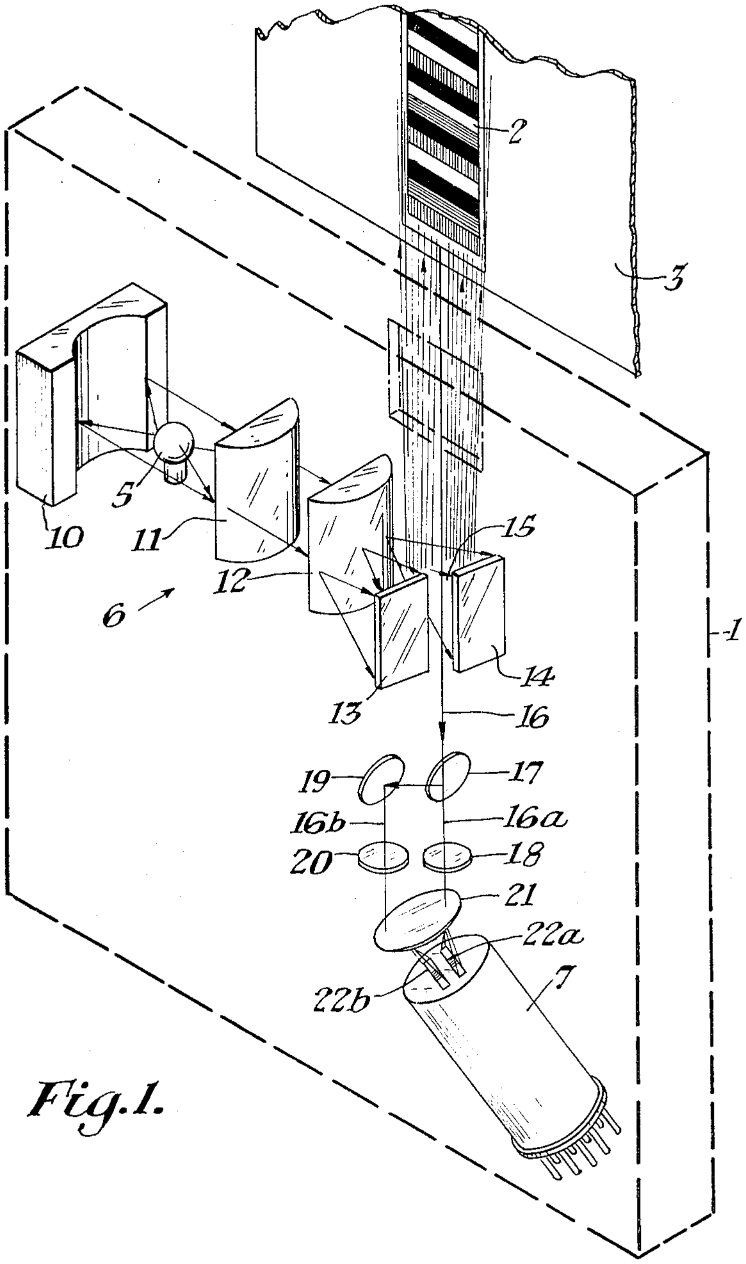
FIG. 1 is a simplified perspective illustration of an opto-electronic wayside scanner in accordance with the present invention.

Referring now to the drawings and in particular to FIG. 1, there is characterized by numeral 1 a wayside scanner according to the present invention. The wayside scanner is preferably mounted on a pedestal which is suitably located at a preselected point along the railroad track to function in cooperative relationship with an identification label 2 which is fixed to the side of a railway vehicle 3. The identification labels may be attached in an appropriate manner to the sides of the railway vehicles within the vertical limits of the field of view of the wayside scanner which in this case is approximately within an 8 foot vertical range. As shown, the label 2 is composed of a vertical array of horizontally disposed colored stripes fabricated from retro-reflective material which has the unique property of reflecting incident light back along the angle of incidence. In practice, the coded format takes the form of a two-positioned base-four code employing red, blue, white and black stripes for representating alphanumeric information, such as, owner and car number and other information peculiar to each individual railway vehicle.

Figure 2:
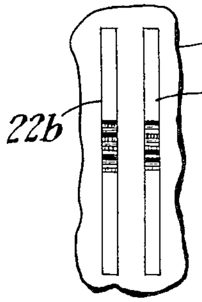
FIG. 2 illustrates an enlarged view of the two separate scanning images as they appear on the face of the electronic dissecting device of the embodiment of FIG. 1.
Figure 2A:
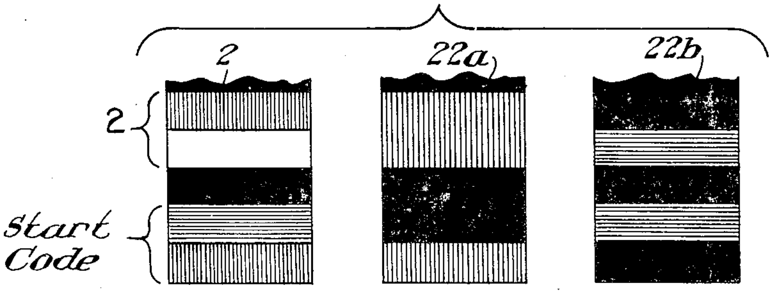
FIG. 2A is a fragmentary and greatly enlarged portion of the vehicle carried coded label and, in particular, a comparison of the coded label as it appears on the side of the railway vehicle versus the two resolved images which appear on the face of the electronic image dissecting or storing device of FIG. 1.

In viewing FIG. 2A, it will be noted that there is shown a bottom portion of the identification label 2 as it would physically appear on the side of the railway vehicle. The individual stripes are generally but not necessarily 6 inches long and approximately 1 inch wide. As previously mentioned, an alphanumeric character is represented by a combination pair of two colored stripes. The bottom red and blue stripe, for example, represents a "start-read" command while the next white and red stripe combination represents the numeral 2. It will be appreciated that various other combinations and pairs of red, blue, white and black stripes represent the other alphanumerical characters as well as other command information and check data which make up coded data of an identification label. A label may be encoded with any given number of combination pairs which are necessary for identifying a vehicle by owner and car number as well as other coded marking for initiating, reporting, stopping, etc., which are common in automatic identification systems. It will be noted that a black stripe is interposed between the lower red-blue combination and the upper white-red combination which was used in opto-mechanical scanning arrangements for system timing purposes. As previously mentioned, the retro-reflective characteristics of the identification label 2 causes impinging light to be reflected back along its line of incidence. Thus, in order to reduce reflections, it has been found advantageous to angularly dispose the scanner 1 with respect to the planar surface of the label 2 so that radiant energy of the sun or any other ambient light source is not reflected back to the scanner by the other reflective surfaces of the vehicle.

As shown in FIG. 1, the opto-electronic scanner basically includes a source of radiant energy, such as, lamp 5, a coaxial optical system generally characterized by numeral 6 and the electronic storage or detecting device, such as, a cathode ray tube 7. A polished reflector 10 is positioned behind a light source 5 for collecting the light rays projected rearwardly thereof. A lens system comprising a toroidal condenser lens 11, and a toroidal projecting lens 12 directs the light rays onto a pair of planar mirrors 13 and 14. Preferably, the mirrors 13 and 14 are rectangular and are angularly disposed in parallel relationship with each other. That is, the mirrors are inclined, for example, at 45° with respect to the light path and are spaced apart a given distance to provide a light return aperture or opening 15, the purpose of which is described presently. It will be seen that since the mirror 14 lies in the shadow of mirror 13, the light rays which are intercepted by mirror 13 are collected and directed from the reflective surface of mirror 14. That is, since the mirror 14 is placed somewhat behind mirror 13, see FIGS. 1A and 1B, substantially all the collected light of source 5 is reflected onto the sides of the moving railway vehicle 3. Thus, it will be seen that no collected light is lost through aperture 15, as was the case in optical systems employing aperture mirrors. That is, the reflective surfaces of both mirrors 13 and 14 will reflect radiant energy from source 5 without intersurface losses while the optical aperture 15 between the mirrors 13 and 14 effectively passes the rectro-reflective radiant energy 16 received from the side of the railway vehicle 3. It will be understood that the lens system and mirrors are arranged to project a horizontally narrow vertically long beam of light defining the field of view of the wayside scanner. In actual practice, it has been found that an arcuate angle in the vertical plane of 55° to 60° will illuminate a relatively long narrow band having a length of approximately 8 feet on the sides of the passing vehicles. Thus, an angle of 55° to 60° will allow a substantial amount of latitude in the location and placement of the identification label on the sides of the vehicles. The reflected radiant energy received from the sides of the vehicles passes through the space or aperture 15 formed between the mirrors 13 and 14. The reflected light 16 which passes through aperture 15 impinges upon a dichroic mirror 17. The dichroic mirror 17 has the spectral characteristics of transmitting one given color and of reflecting another given color. In the opto-electronic scanner of FIG. 1, the dichroic mirror 17 transmits red light and reflects blue light. The transmitted red light **16*a* passes through a red pass filter 18 while the reflected blue light 16*b* impinges upon an angularly disposed planar mirror 19 which in turn directs the light through a blue pass filter 20. Thus, the single returning beam of white light is separated into two separate spectral responsive paths, namely, a blue and a red path so that the optical characteristics of each of the various colored strips may be resolved as will be described presently. A wide angle objective lens 21 is interposed in the two spectral return paths. As shown, the central planar axis of the lens 21 is disposed at a slight oblique with respect to the two light paths 16*a* and 16*b*. Thus, the imaging lens 21 not only forces an image of each of the two spectral responses upon the face of the image storing device 7 but also removes any distortion or offsetting imparted to the colored stripes due to the angular disposition of the wayside scanner with respect to the sides of the railway vehicles. It has been found that by introducing an angle which is equal and opposite to that of the scanner angle disposition, any deviation of the stripes above and below the horizontal scanner axis is effectively removed. Thus, the images 22*a* and 22*b* focused on the face of image tube 7 are resolved undistorted reproductions of the two spectral responses of the color coded label 2**.

That is, in viewing FIG. 2A, it will be seen that the two images impinging upon the face of the image storage device 7 form the red and blue light components of label 2. In more closely examining the images **22*b* and 22*a* of FIG. 2A, it will be noted that the images either contain a blue and black or a red and black spectral characteristic respectively. As shown, the first bottom red stripe of the first combination pair of label 2 results in an only red stripe appearing in the red image 22*a* while a black or blank stripe appears in the corresponding position in the blue image 22*b*. Likewise, the second blue stripe of the first combination pair only results in a blue stripe appearing in the blue image 22*b*. The next intermediate black stripe causes a black or blank stripe to appear in both the red image 22*a* and the blue image 22*b*. The first white stripe of the second combination pair results in a stripe appearing in both the red image 22*a* and blue image 22*b*. Thus, it can be seen that the color coded stripes of the identification label 2 are resolved in two spectral responses, namely, red and blue light components. As noted above, it will be appreciated that the separation of colors into two discrete spectral images is a necessary requirement for determining the command instructions and decimal digits of the coded combination of striped pairs. Thus, by arranging the images in side-by-side relationship on the face of the tube, the particular stripe of each image may be sampled and scanned by the image storage or pickup device 7. In the present instance, the pickup device 7** is a single aperture image dissector tube; however, it is understood that other devices, such as, a dual aperture dissector, dual multiplier image dissector, a solid state silicon array with digital scan, or vidicons, plumbicons and tivicons with single or dual mosaics may be equally used in practicing the present invention.

The image dissector 7 includes an evacuated envelope and is provided with a photocathode which is located on the inner surface of the face plate. The focused images **22*a* and 22*b* on the face of the image dissector 7** excite the photoconductive material so that an electron field corresponding to the optical images is emitted by the photocathode. A rectangular aperture having a horizontal dimension longer than the length of the image is located within the envelope and is spaced some distance from the photocathode. The vertical dimension of the rectangular aperture is preferably less than the width of the imaged stripes so that the electron field pattern of each separate colored stripe may be sampled and scanned individually. Thus, the aperture samples the video information contained in the field by simultaneously moving the field up and down and sideways with respect to the aperture. That is, the electron field corresponding to the optical images is deflected in a horizontal and vertical direction by means of suitable magnetic fields which are generated within electromagnetic coils which will be described presently.

Figure 3:
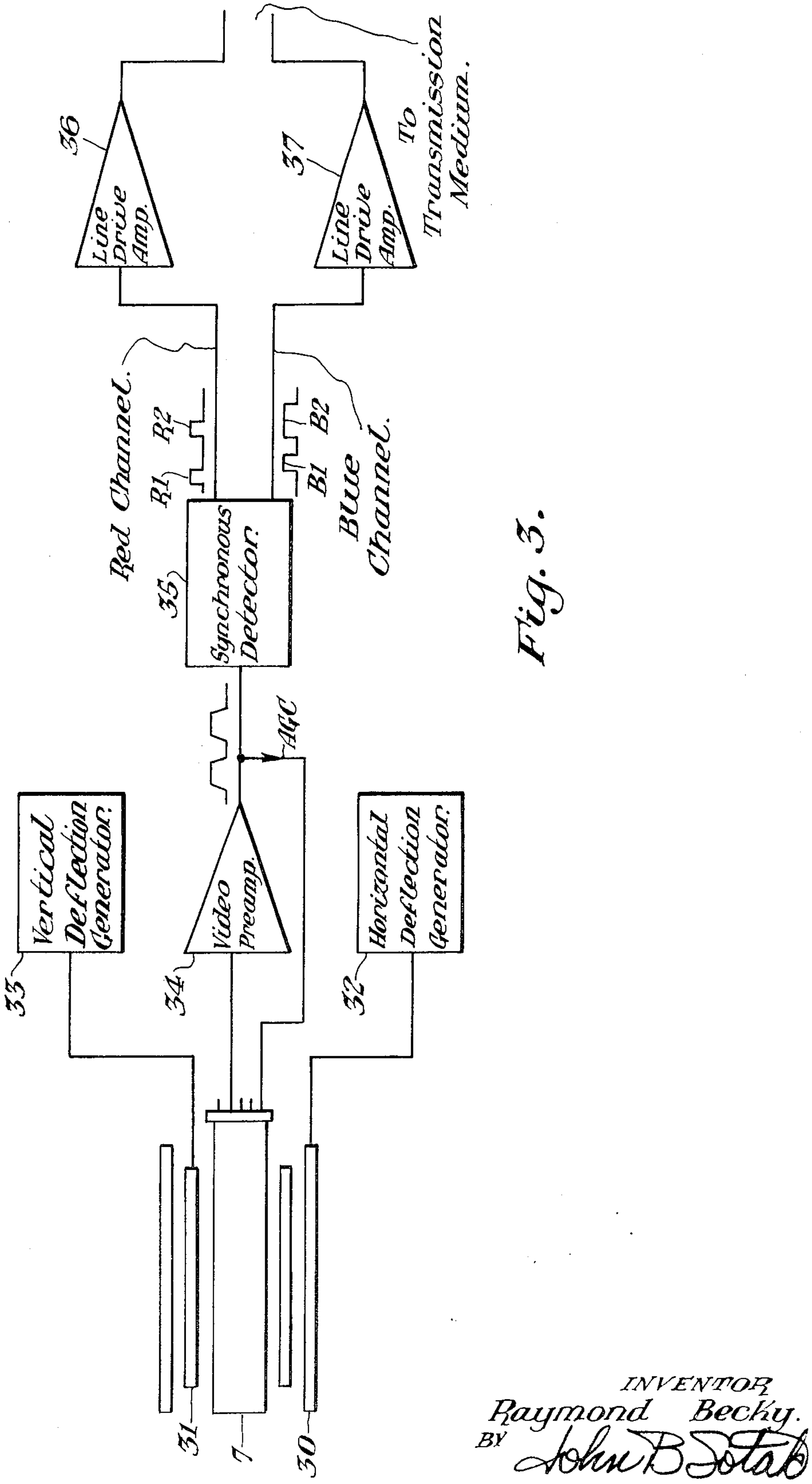
FIG. 3 is a schematic block diagram illustrating the video circuits which cooperate with the image dissector to produce corresponding video signals in accordance with the teachings advanced by this invention.

As shown in FIG. 3, the horizontal deflection coil 30 is electrically connected to the horizontal deflection generator 32 while the vertical deflection coil 31 is electrically connected to the vertical deflection generator 33. Thus, the electron image field is capable of being magnetically deflected in both a vertical and horizontal direction so that the rectangular aperture alternately scans and samples both of the resolved images. The video information of both images is converted to electrical signals or pulses by a dynode of the image dissector. The electrical pulses preferably are then amplified by a multistage electron multiplier which is also contained within the image dissector 7. As shown, amplified signals derived from the electron multiplier are, in turn, fed to a video preamp for further amplification. As shown, a portion of the video amplified signal is fed back to control the dynode potentials for automatic gain control purposes. The amplified video signals are taken from the video amplifier 34 and applied to a synchronous detector 35 which separates the video signals into red and blue channels, respectively. The red and blue channels are in turn fed to line drive amplifiers 36 and 37, respectively, to produce line signals for transmission over a line wire or any other suitable communication link to, for example, an office location having the necessary decoding logic.

In describing the operation, it will be assumed that the passing railway vehicle 3 is momentarily situated in relation to the wayside scanner 1 as shown in FIG. 1. Under this condition, the light emanating from the scanner 1 is fanned out in a vertical direction approximately 55° – 60° so that the substantially narrow relatively long beam of light completely illuminates the coded label 2. As previously mentioned, the relatively long vertical dimension of the field of view allows placement of the coded label 2 at various heights on the side of the vehicle 3. Thus, it will be appreciated that, at some instant, each of the passing railway vehicles will assume a position in which its label is within the field of view, as shown in FIG. 1. The light reflected from the vehicle passes through the aperture 15 formed between the planar mirrors 13 and 14 and impinges upon the dichroic mirror 17. The red component of the reflected light passes through the dichroic mirror 17 as shown by **16*a* through filter 18 and is focused upon the face of the image dissector 7 by lens 21. In a like manner, the blue component of the reflected light received by the dichroic mirror is reflected onto mirror 19. The blue component is reflected by mirror 19 as shown by 16*b*, then passes through the filter 20 and is focused by lens 21 to provide a blue image 22*b* upon the image dissector 7. As previously noted, the radiation of each image causes an electron image field to be emitted by the photocathode which is sequentially sampled and scanned. The vertical deflection generator creates an electromagnetic field in the coil 31 which has a sweep time in the order of 1.4 to 4 milli-seconds. The horizontal deflection generator 32 creates an electromagnetic field in the coil 30 which has a scanning frequency in the order of 200 to 500 kilocycles. As previously mentioned, the images 22***a* and 22*b* are sampled and scanned in an alternate manner so that the electron field, for example, of the blue image is first deflected through the rectangular aperture and then the electron field created by the red image is deflected through the rectangular aperture of the image dissector 7. The electron field emanating from the photocathode is next moved or deflected such that the next upper portion or stripe of the image is sampled. The deflector of the electron field continues until each stripe of both images is completely scanned and sampled. Thus, the electrons of the field bombard the dynode to produce a series of electrical signals or pulses which are representative of the coded information of the vehicle carried label. The electrical signals are applied to the electron multiplier stages of the image dissector and, in turn, are delivered to the input of the video preamp 34. For example, let us first assume that the rectangular aperture of the image dissector is sampling the lower black stripe of the blue image 22*b*. It will be appreciated since little, if any, radiation impinges upon this portion of image dissector 7, no electrons are emitted by this portion of the photocathode. Thus, with no electrons directed through the aperture and no video signal produced by the dynode, the multiplier stages are inactive so that no video signal is available at the input or output of the video preamp 34 at this time. Next, the horizontal deflection generator 32 causes the magnetic field produced by deflection coil 30 to shift the electron field whereby the rectangular aperture is sampling the lower stripe of the red image 22*a*. The radiation of the red image stripe now causes electrons to be emitted by the photocathode. The electrons striking the dynode produce a video output which is amplified by the multiplier stages and in turn applied to the video preamp 34. Thus, the synchronous detector 35 produces a pulse R1 as shown in the red channel of FIG. 3 at this time. The vertical deflection generator 33 next causes a vertical shift in the sampling procedure while a horizontal blanking action takes place so that the rectangular aperture will sample the second stripe of the blue image 22*b*. Now electrons from the blue stripe causes the dynode to produce a second video pulse. This video pulse is amplified by both the multiplier and preamp. An output signal is again available at the video preamp. The output signal is applied to the input of the synchronous detector which now produces a pulse B1 in the blue channel as shown in FIG. 3. Since the adjacent stripe of red image 22*a* is absent of any color or is black, no electrons will bombard the dynode so that no pulse appears in the red channel at this time. Similarly, the intermediate black stripe of each image is sequentially scanned next so that no electrons are available in either the blue or red images. It will be appreciated that this type of scanning and sampling of each of the images continues until the entire field of view and complete surface of the coded label is covered. It will be noted that a next white stripe on the label 2 causes an image to appear in both images so that during both scanning periods and pulses, such as, signals R2 and B2 are produced in both the red and blue channels at this time. Thus, the synchronous detector produces a train of pulses in the red channel as well as in the blue channel in appropriate time slots so that the line drivers 36 and 37 produce output signals which may be transmitted in any appropriate manner to the decoding logic which may be remotely located from the wayside scanner. Thus, it can be seen that the coded markings in the form of two striped combination pairs can be appropriately electronically sampled and scanned by the apparatus of this invention so that intelligence or useable information data may be derived from the passing railway vehicles in an efficient and reliable manner.

Figure 1A:
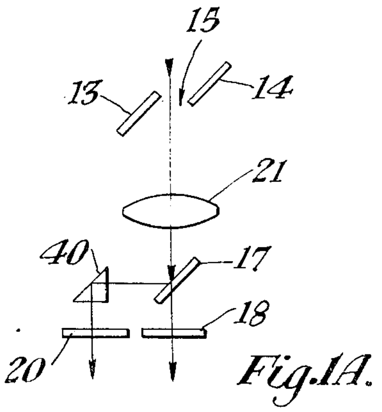
FIG. 1A is a fragmentary diagrammatic representation of an alternative optical system to that illustrated in FIG. 1.

Referring now to FIG. 1A, there is shown an alternate form of an optical system which may be used in place of the optical system of FIG. 1. Like in FIG. 1, the optical system of FIG. 1A employs a pair of angularly disposed planar mirrors 13 and 14 for reflecting fanned out beams of radiant energy from a source onto the sides of the passing vehicles. As shown, the mirrors are slightly spaced apart to provide an optical aperture 15 for the returning reflected radiant energy. In the optical system of FIG. 1A, the wide angle objective lens has been placed intermediate the planar mirrors 13 and 14 and the dichroic mirror 17. In addition, a prism 40 has been disposed in the blue component path in the place of the planar mirror 19 of FIG. 1. The remaining elements, namely, the red and blue filters 18 and 20, respectively, are disposed in the red and blue paths in substantially the same manner as in FIG. 1. The reflective index of the prism 40 is selected to give approximately equal light paths for the red and blue components. The equalization of the separate paths allows for more accurate alignment of the images on the face of the image dissector 7. That is, less vertical displacement exists between the respective stripe positions of the two images when equal light paths are provided for the red and blue light components.

Figure 1B:
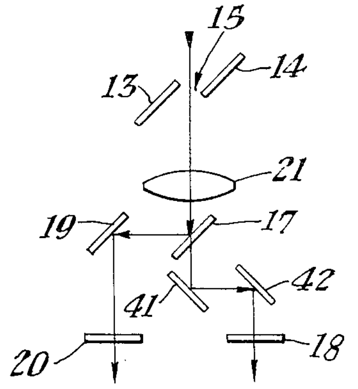
FIG. 1B is a fragmentary diagrammatic representation of another alternative optical system to that illustrated in FIG. 1.

FIG. 1B illustrates an alternate arrangement wherein equalization of the light paths is accomplished by the use of a pair of silvered mirrors 41 and 42. That is, the reflective light from the wayside vehicles first passes through the aperture 15 provided by the angularly disposed planar mirrors 13 and 14 and then passes through the wide angle objective image lens 21. The objective lens focuses the received radiant energy upon the dichroic mirror 17. The red component of the reflected light passes through the dichroic mirror 17 onto a first silvered mirror 41. The impinging red component is then reflected by mirror 41 onto mirror 42 wherein it is reflected and passed through the red filter 18. The blue component of the reflected light is reflected by the dichroic mirror onto the silvered mirror 19 and in turn passes through the blue filter 20, like in FIG. 1. Thus, FIGS. 1A and 1B provide two methods of equalizing the length of the two light component paths in the coaxial optical system.

Thus, it can be seen that the apparatus of this invention provides a more efficient and effective manner of optically scanning a colored coded information label carried by moving railway vehicles. While the invention has been described in regard to a railroad environment, it will be appreciated that the presently described static opto-electronic scanner may be employed in any other milieu which employs a coded label for representing information data peculiar to any given object. For example, my invention may be used in a conveyor system wherein boxes, luggage or other articles are moved from place to place or in a rubber tired vehicle environment, such as, buses, taxi-cab monitoring operations as well as in other systems which require identification and classification of moving objects. But regardless of the manner in which the invention is used, it is understood that various changes, modifications and alterations may be made by persons skilled in the art without departing from the spirit and scope of this invention.

Having thus described my invention, what I claim is:

1. A static opto-electronic scanner for sensing coded markings of an information field comprising, a source of radiant energy, an optical system for directing substantially all of the radiant energy from said source onto said information field as a horizontally narrow vertically long band of radiant energy including a pair of planar mirrors in spaced parallel relationship with each other a dichroic mirror and a first and second filter for resolving the reflected radiant energy received from said information field into two complete separate spectral images of the coded markings of the information field onto the face of an electronic imaging means, said electronic imaging means sampling and scanning said two separate spectral images and for producing video signals corresponding to the coded markings of the information field.

2. A static opto-electronic scanner as defined in claim 1, wherein said optical system includes a wide angle objective lens for removing angular distortion which is present in the reflected radiant energy received from said information field.

3. A static opto-electronic scanner as defined in claim 1, wherein said electronic imaging means comprises an image dissector for producing the video signals which are fed to a video preamplifier and in turn to a synchronous detector which produces a train of pulses for each of the two separate spectral images.

4. A static opto-electronic scanner as defined in claim 1, wherein said electronic imaging means comprises a cathode-ray tube and the video signals are applied to a video preamplifier for amplification and a portion of the amplified signals is fed back to said cathode-ray tube for automatic gain control.

5. A static opto-electronic scanner as defined in claim 1, wherein said optical system includes condensing and projecting lenses for forming said band of radiant energy.

6. A static optic-to-electronic scanner comprising, a source of radiant energy, first optical means for projecting a vertical band of radiant energy from said source, second optical means for reflecting substantially all of said vertical band of radiant energy onto a retroreflective identification label having coded data and for permitting passage of radiant energy reflected by said retroreflective identification label, third optical means for separating the reflected radiant energy into two paths in accordance with the spectral characteristics of the coded data, fourth optical means for focusing two entire separate images of the coded data in side-by-side relationship onto the surface of an electronic image storage device, said electronic image storage device sequentially sampling and scanning said two separate images and producing video output signals in accordance with the spectral characteristics of the coded data so that useable intelligence may be derived from said identification label.

7. An optic-to-electronic scanner as defined in claim 6, wherein said first optical means includes a toroidal condensing and a toroidal projecting lens.

8. An optic-to-electronic scanner as defined in claim 6, wherein said second optical means including a first planar mirror angularly disposed relative to said radiant energy source and said identification label and a second planar mirror spaced from and disposed at the same angle as said first planar mirror.

9. An optic-to-electronic scanner as defined in claim 6, wherein said third optical means includes a dichroic mirror and a pair of filters having spectral responses corresponding to the spectral characteristics of the coded data.

10. An optic-to-electronic scanner as defined in claim 6, wherein said fourth optical means includes a wide angle objective lens which is angularly disposed relative to the paths of the reflected radiant energy for removing angular distortion from the two images focused on the surface of said electronic storage device.

11. An optic-to-electronic scanner as defined in claim 6, wherein said electronic image storage device comprises an image dissector having horizontal and vertical controls for alternately sampling and scanning the two images.

12. An optic-to-electronic scanner as defined in claim 6, wherein said electronic image storage device comprises a cathode-ray tube having horizontal and vertical deflection means for alternately sampling and scanning the two images.

13. An optic-to-electronic scanner as defined in claim 6, wherein said coded data comprises a plurality of colored stripes arranged in a two color stripe combination.

14. An optic-to-electronic scanner as defined in claim 6, wherein said coded data comprises a vertical array of horizontal disposed colored stripes.

* * * * *